United States Patent

Yamamoto et al.

(10) Patent No.: US 10,079,038 B2
(45) Date of Patent: Sep. 18, 2018

(54) OPTICAL DISC DEVICE AND OPTICAL DISC READING METHOD

(71) Applicant: Panasonic Intellectual Property Management Co., Ltd., Osaka (JP)

(72) Inventors: Yoshikazu Yamamoto, Osaka (JP); Yoshihisa Takahashi, Osaka (JP); Atsushi Kiyomura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/718,378

(22) Filed: Sep. 28, 2017

(65) Prior Publication Data

US 2018/0108378 A1   Apr. 19, 2018

(30) Foreign Application Priority Data

Oct. 13, 2016   (JP) ................ 2016-201716

(51) Int. Cl.
G11B 27/10   (2006.01)
G11B 20/18   (2006.01)
G11B 20/10   (2006.01)

(52) U.S. Cl.
CPC .... *G11B 20/1816* (2013.01); *G11B 20/10388* (2013.01)

(58) Field of Classification Search
CPC ............. G11B 20/1883; G11B 27/36; G11B 20/10527; G11B 220/2545; G11B 27/034; G11B 27/34; G11B 7/005; G11B 20/1403

USPC ........ 369/53.36, 47.32, 44.33, 44.34, 83, 84
See application file for complete search history.

(56) References Cited

U.S. PATENT DOCUMENTS

| 5,574,881 | A | 11/1996 | Yasuoka et al. |
| 5,832,200 | A | 11/1998 | Yoda |
| 2012/0124415 | A1 | 5/2012 | Borkenhagen et al. |
| 2013/0212428 | A1* | 8/2013 | Yamamoto .......... G06F 11/2046 714/6.21 |

FOREIGN PATENT DOCUMENTS

| JP | 2-81383 | 3/1990 |
| JP | 6-103702 | 4/1994 |
| JP | 8-263226 | 10/1996 |
| JP | 11-25572 | 1/1999 |
| JP | 11-25574 | 1/1999 |

* cited by examiner

*Primary Examiner* — Nabil Hindi
(74) *Attorney, Agent, or Firm* — Wenderoth, Lind & Ponack, L.L.P.

(57) ABSTRACT

An optical disc device includes: an optical disc drive that reads data from a plurality of optical discs in which user data is recorded while distributed in the plurality of optical discs; a memory unit in which data read from an optical disc of a first group that is a part of the plurality of optical discs is recorded through the optical disc drive; and a controller that reproduces the user data from data of a remaining optical disc except for the first group, the data of the remaining optical disc being read through the optical disc drive, and the data recorded in the memory unit.

6 Claims, 5 Drawing Sheets

FIG. 5

| Address (Sector unit) | Data | Error detection and correction |
|---|---|---|
| 1 | 0xA2F5 | Nothing |
| 2 | 0xBB4D | Corrected |
| 3 | 0xBDE0 | Nothing |
| 4 | 0x0000 | Nothing |
| 5 | 0x0000 | Error |
| ⋮ | ⋮ | ⋮ |
| M | 0xAA55 | Corrected |

OPTICAL DISC DEVICE AND OPTICAL DISC READING METHOD

BACKGROUND

1. Technical Field

The present disclosure relates to an optical disc device that reads data recorded in an optical disc and an optical disc reading method for reading the data recorded in the optical disc.

2. Description of the Related Art

In an information processing technology field, information such as user data is generally recorded in a storage medium typified by a hard disk drive (HDD, hard drive). There are redundant arrays of inexpensive disks (RAID) as a technology of preventing loss of the user data stored in the HDD or the like and improving reliability of reading the user data. In the RAID, the user data is redundantly recorded in a plurality of HDDs. Therefore, even if a part of HDDs is broken down, the user data can be reproduced by the remaining HDDs.

Unexamined Japanese Patent Publication Nos. 11-025574 and 08-263226 disclose a technology in which the RAID is applied when a plurality of optical discs are used as the storage medium.

SUMMARY

According to one aspect of the present disclosure, an optical disc reading method includes: loading an optical disc of a first group that is a part of a plurality of optical discs from the plurality of optical discs in which user data is recorded while distributed in the plurality of optical discs in an optical disc drive, reading data from the optical disc, and storing the data into a memory unit; and reproducing based on (i) data read from a remaining optical disc except for the first group and (ii) data which is read from the optical disc of the first group and is stored in the memory unit.

In the optical disc reading method of the present disclosure, in the case that the user data is recorded by applying the RAID technology to the plurality of removable storage media, the user data can be reproduced even in an environment different from an environment in which the data is recorded in the storage media.

BRIEF DESCRIPTION OF THE DRAWINGS

FIG. 5 is a view illustrating an example of information stored in a memory unit.

DETAILED DESCRIPTION

Hereinafter, exemplary embodiments will be described in detail with reference to the drawings as appropriate. However, sometimes detailed descriptions more than necessary will be omitted. For example, in some cases, detailed description of a well-known item and repeated description related to a substantially identical configuration will be omitted. This is to avoid that the following description is unnecessarily redundant, and to facilitate the understanding of those skilled in the art.

It is noted that the inventors provide attached drawings and the following description for those skilled in the art to fully understand the present disclosure, and do not intend to limit the subject matter as described in the appended claims.

First Exemplary Embodiment

Unlike the case that the user data is recorded in the HDD using the RAID, a new problem occurs in the case that the user data is recorded in a removable storage medium such as the optical disc using the RAID. In the removable storage medium such as the optical disc, sometimes a device that records the user data and a device that reads the user data are not always identical to each other.

For example, in the case that a number of optical discs in which the user data is recorded using the RAID is larger than a number of optical disc drives included in the optical disc device, all the optical discs cannot be loaded in the optical disc drives at once. Therefore, the data cannot simultaneously be read from the optical discs, and the user data cannot be reproduced.

In the case that the optical disc drive that reads the data can access only one side of the optical disc while the user data is recorded in both sides of the optical disc using the RAID, similarly the data cannot simultaneously be obtained from all the optical discs.

Figure 1:
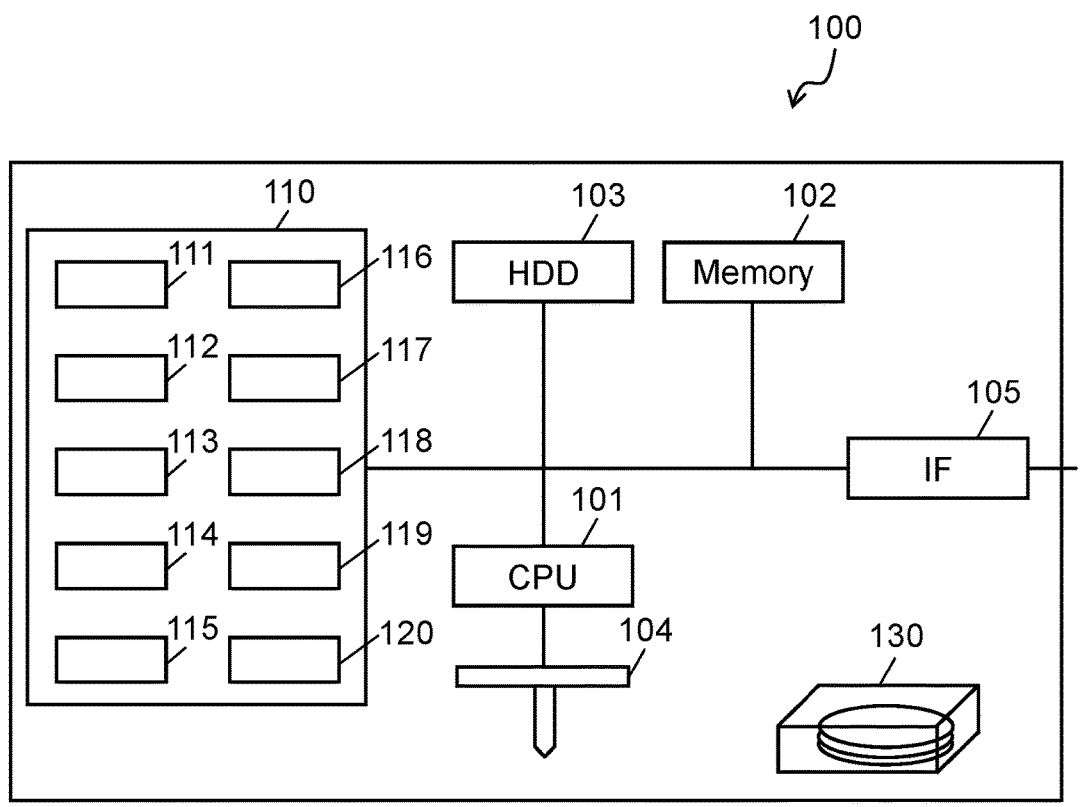
FIG. 1 is a configuration diagram illustrating a disc device that records user data while distributing the user data in a plurality of optical discs.

FIG. 1 is a configuration diagram illustrating a disc device that records the user data in a plurality of optical discs while distributing the user data in the plurality of optical discs. Optical disc device 100 includes central processing unit (CPU) 101, memory 102, HDD 103, disc conveyance robot 104, interface 105, optical disc drive array 110, and disc magazine 130.

CPU 101 is a controller that controls a whole of optical disc device 100. CPU 101 controls disc conveyance robot 104 to control the conveyance of the optical disc between disc magazine 130 and optical disc drive array 110. CPU 101 controls transmission and reception of a command or data to and from an external device through interface 105. CPU 101 controls operation of optical disc device 100 with respect to a content except for the above contents.

Figure 2:
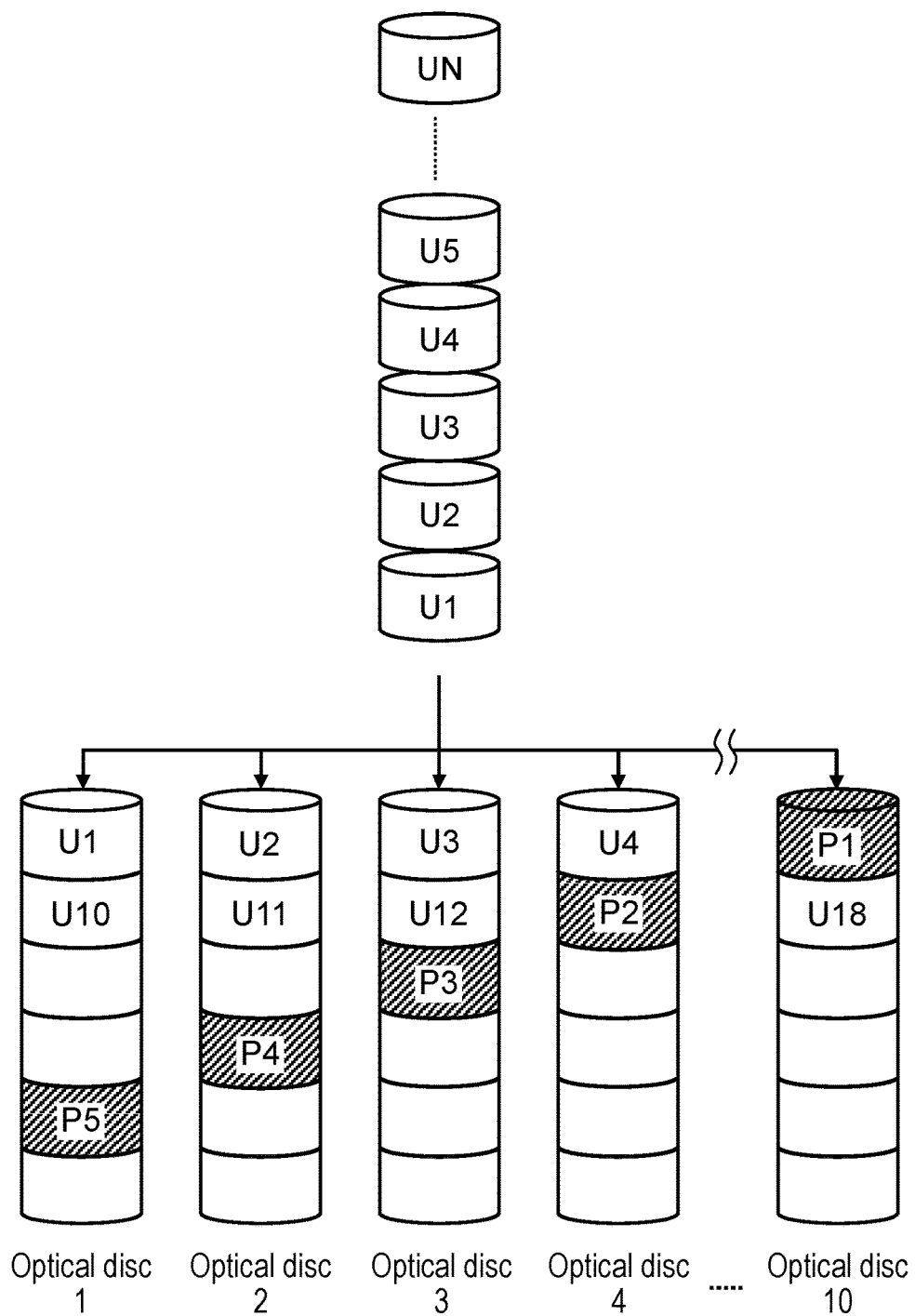
FIG. 2 is an explanatory view when the user data is recorded while distributed in the plurality of optical discs.

CPU 101 controls recording processing using the RAID technology, when CPU 101 records the user data in a plurality of optical discs while distributing the user data in the plurality of optical discs. For example, as illustrated in FIG. 2, CPU 101 records input pieces of user data U1, U2, U3, . . . , UN in the plurality of optical discs (optical discs 1 to 10). CPU 101 generates pieces of parity information P1, P2, . . . that are of an error correction code in a predetermined unit of the plurality of distributed optical discs. In this case, one line arrayed in a horizontal direction in FIG. 2 is the predetermined unit of the plurality of optical discs. CPU 101 records the pieces of parity information P1, P2, . . . in one of optical discs 1 to 10. Thus, the data is recorded in the plurality of optical discs while distributed in the plurality of optical discs, and the parity information that is of the error correction code is recorded. Therefore, even if the data is not read because one of the optical discs is broken, the user data can be reproduced from the remaining optical discs.

The above description of the RAID is made by way of example, but the present disclosure is not limited to the above description of the RAID. The RAID includes a plurality of recording methods according to a degree of reliability necessary for the user data or redundancy. A user can use a suitable RAID recording method. The present application is not limited to the use of the RAID. Another method except for the RAID may be adopted as long as the data is recorded in a plurality of removable storage media while distributed in the plurality of removable storage media.

In the first exemplary embodiment, the case that a CPU is used is cited as an example of a specific method for constructing the controller. However, the present disclosure is not limited to the CPU, but the controller may be constructed by another method. For example, the controller may be constructed with a field programmable gate array (FPGA), a digital signal processor (DSP), or another integrated circuit instead of the CPU.

Memory 102 is used as a place where a software program operating CPU 101 is preserved or a place where the data is temporarily stored when CPU 101 executes the software program. Memory 102 may be used as a buffer in which the recording target data is temporarily stored when optical disc drives 111 to 120 record the data in the plurality of optical discs while distributing the data in the plurality of optical discs. Such a function can also be implemented by HDD 103 described later.

Either a volatile memory or a nonvolatile memory may be used as memory 102 as long as the memory satisfies the above function. In the case that a capacity of memory 102 is increased, HDD 103 described later can be replaced with memory 102. In this case, generally high-speed access to the data recorded in memory 102 can be gotten compared with HDD 103.

HDD 103 can be used as a memory unit in which the data to be recorded is temporarily stored when the data is recorded in the optical disc drive. Generally, in HDD 103, a storage capacity can be increased at low cost compared with memory 102. HDD 103 can be replaced with a solid state drive (SSD), for example.

One of or both memory 102 and HDD 103 can construct the memory unit disclosed in the present application.

Disc conveyance robot 104 takes out the optical disc from disc magazine 130 inserted in optical disc device 100, and transfers the optical disc to each of optical disc drives 111 to 120 in optical disc drive array 110. Disc conveyance robot 104 obtains the optical disc in which the user data is recorded from each of optical disc drives 111 to 120 in optical disc drive array 110, and returns the optical disc to original disc magazine 130.

In the first exemplary embodiment, disc conveyance robot 104 is used by way of example. However, the present disclosure is not limited to the use of disc conveyance robot 104. A user may manually take out the optical disc from disc magazine 130, and install the optical disc in each of optical disc drives 111 to 120 in optical disc drive array 110. Any method can be adopted as long as the plurality of optical discs, in which the user data is recorded while distributed, are properly disposed in the optical disc drives.

Interface 105 transmits and receives a command controlling optical disc device 100, a response to the command, the data recorded in the optical disc, and the data read from the optical disc to and from the external device. CPU 101 controls interface 105. Interface 105 may be constructed in a wired or wireless manner. In the wired manner, Ethernet (registered trademark) can typically be cited.

Optical disc drive array 110 includes the plurality of optical disc drives 111 to 120. In the first exemplary embodiment, optical disc drive array 110 includes 10 optical disc drives. However, the present disclosure is not limited to 10 optical disc drives. The number of optical disc drives may be different from the number of optical disc drives of the first exemplary embodiment as long as optical disc drive array 110 records the user data using the plurality of optical disc drives while distributing the user data in the plurality of optical discs.

Optical disc drives 111 to 120 are a device that records the data in the optical disc. Examples of the optical disc include a compact disc (CD), a digital versatile disc (DVD), and a Blu-ray Disc (registered trademark), but the present disclosure is not limited to any of those media. Any media may be used as long as information can be recorded by changing an optical characteristic of a recording medium using a laser beam.

Figure 3:
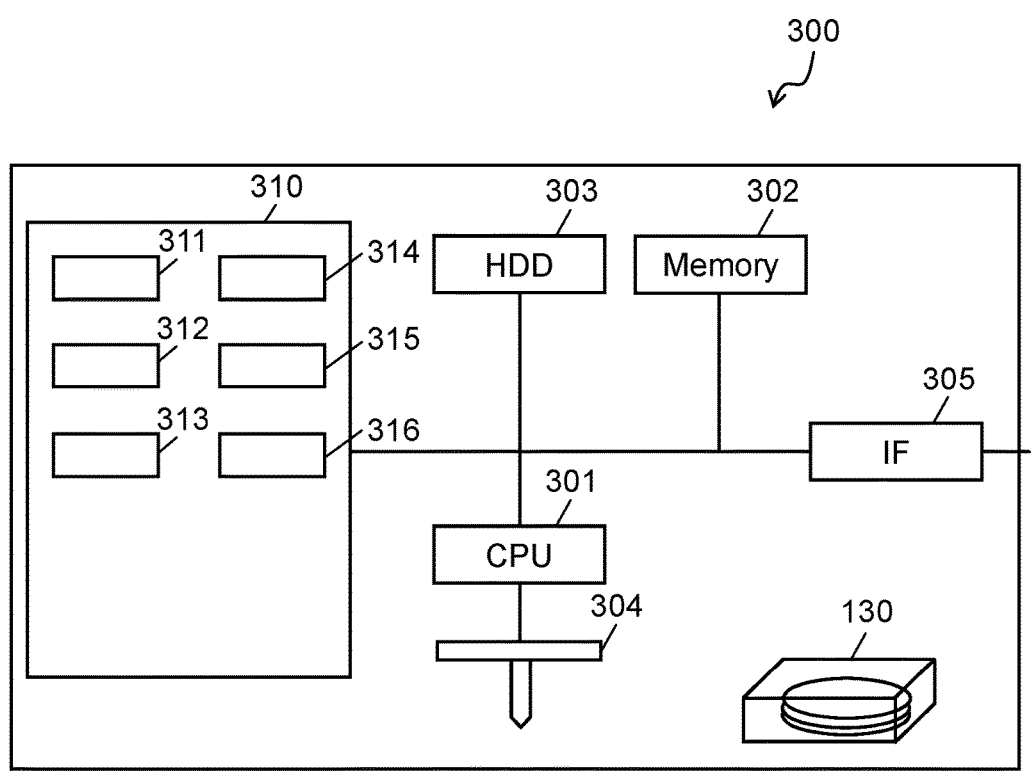
FIG. 3 is a configuration diagram illustrating a disc device that reads the user data, which is recorded while distributed in the plurality of optical discs.

FIG. 3 is a configuration diagram illustrating a disc device that reads the user data, which is recorded while distributed in the plurality of optical discs. Optical disc device 300 includes CPU 301, memory 302, HDD 303, disc conveyance robot 304, interface 305, and optical disc drive array 310.

CPU 301 is a controller that controls a whole of optical disc device 300. CPU 301 controls disc conveyance robot 304 to control the conveyance of the optical disc between disc magazine 130 and optical disc drive array 310. CPU 301 controls the transmission and reception of, for example, the command or data to and from an external device through interface 305. CPU 301 controls the operation of optical disc device 300 with respect to a content except for the above contents.

As illustrated in FIG. 2, CPU 301 reproduces the original user data from the data, which is recorded in the plurality of optical discs while distributed in the plurality of optical discs by a RAID rule. A reproduction algorithm can be implemented by a software program in which the existing RAID technology can be performed by CPU 301.

CPU 301 may be constructed with the FPGA, the DSP, or another integrated circuit similarly to CPU 101 of optical disc device 100.

Memory 302 is used as a place where the software program operating CPU 301 is preserved or a place where the data is temporarily stored when CPU 301 executes the software program. Memory 302 may be used as a place where the data read from optical disc drives 311 to 316 is temporarily stored. Such a function can also be implemented by HDD 303 described later.

Either a volatile memory or a nonvolatile memory may be used as memory 302 as long as the memory satisfies the above function. In the case that a capacity of memory 302 is increased, HDD 303 can be replaced with memory 302. In this case, generally high-speed access to the data recorded in memory 302 can be gotten compared with HDD 303.

HDD 303 is a part of the memory unit in which the optical disc data read through optical disc drives 311 to 316 is stored. As to the memory unit used to store the large-capacity data, generally the use of HDD 303 frequently suppresses cost compared with the use of memory 302. HDD 303 can be replaced with an SSD, for example.

Disc conveyance robot 304 conveys the optical disc between disc magazine 130 and optical disc drive array 310 (optical disc drives 311 to 316). In the first exemplary embodiment, disc conveyance robot 304 is used by way of example. However, the content disclosed in the present application is not limited to the use of disc conveyance robot 304. Any method can be adopted as long as the plurality of optical discs, in which the user data is recorded while distributed, are properly disposed in the optical disc drives.

Interface 305 transmits and receives a command controlling optical disc device 300, a response to the command, and the data to and from the external device. Interface 305 may be constructed in a wired or wireless manner similarly to interface 105.

Optical disc drive array 310 includes a plurality of optical disc drives 311 to 316. In the first exemplary embodiment, optical disc drive array 310 includes six optical disc drives by way of example. However, the content disclosed in the present application is not limited to the six optical disc drives. It is only necessary for optical disc drive array 310 to include at least one optical disc drive.

In optical disc device 300 of the first exemplary embodiment, in the case that the user data is recorded in the plurality of optical discs while distributed in the plurality of optical discs using the RAID or the like, the number of optical disc drives used to read the optical disc is less than the number of distributed recording optical discs. Any number of optical disc drives may be included in optical disc drive array 310 as long as the condition is satisfied.

Optical disc drives 311 to 316 are a device that reads data from the optical disc. Similarly to optical disc drives 111 to 120 of optical disc device 100, any storage medium may be used as long as the data recorded in the storage medium is read by optical control.

In the first exemplary embodiment, optical disc device 100 that records the data in the optical disc and optical disc device 300 that reads the data from the optical disc are separated from each other. However, the optical disc device described in the present application is not limited to this configuration. For example, the same optical disc device may record and read the data.

The number of optical disc drives 311 to 316 included in optical disc drive array 310 of optical disc device 300 that reads the data is not necessarily less than the number of optical disc drives 111 to 120 of optical disc drive array 110 of optical disc device 100 that records the data. Even in the case that the same optical disc device records and reads the data, the present disclosure can be used as long as the number of optical disc drives used to read the data is less than the number of distributed recording optical discs.

Figure 4:
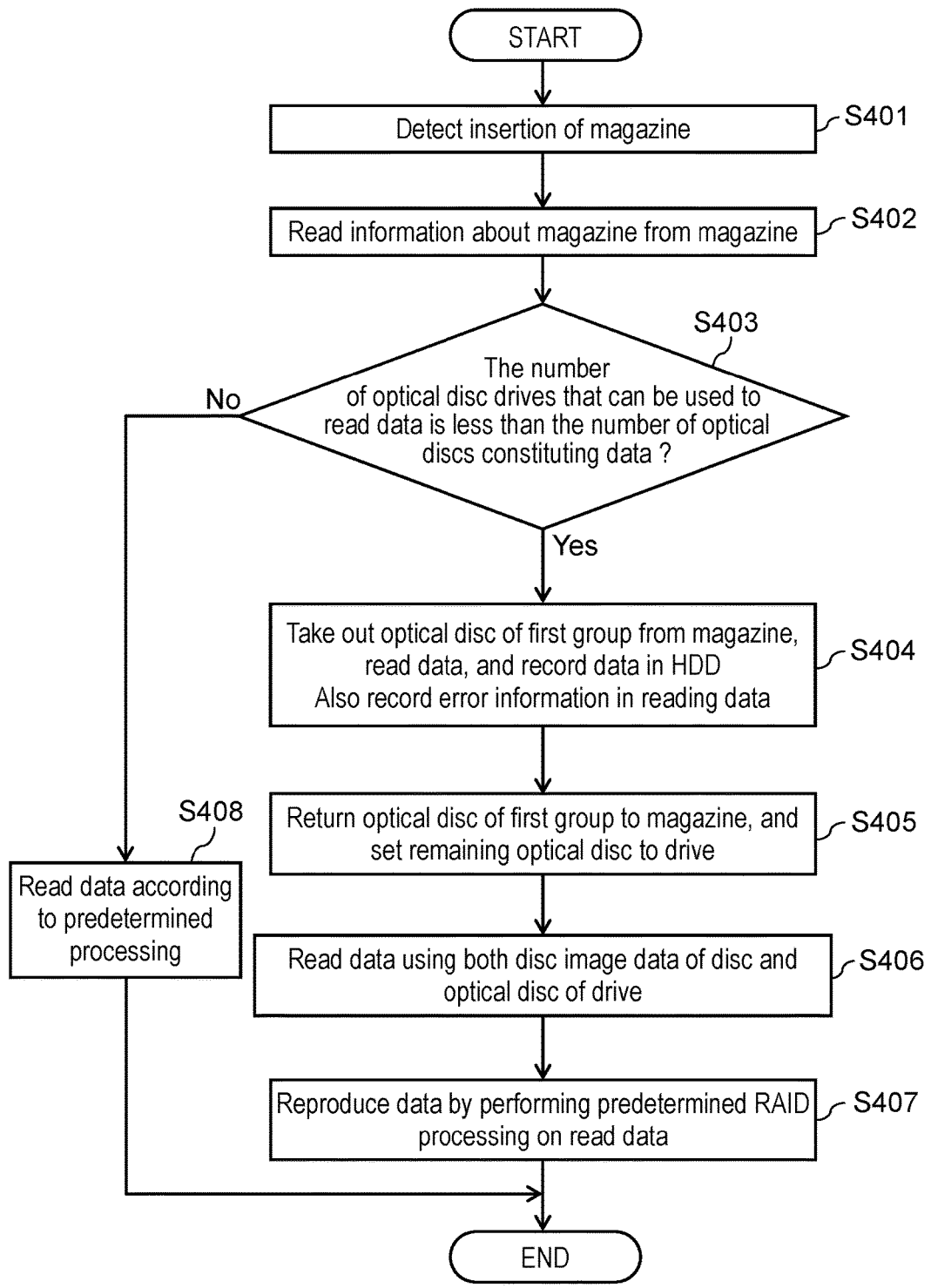
FIG. 4 is a flowchart illustrating processing when the disc device reads the user data.

FIG. 4 is a flowchart illustrating processing when the disc device reads the user data.

(Step S401) When disc magazine 130 storing the optical disc in which the data is recorded is installed in optical disc device 300, a detection mechanism (not illustrated) or the like notifies CPU 301 that disc magazine 130 is installed.

(Step S402) CPU 301 moves disc conveyance robot 304 to disc magazine 130. When disc conveyance robot 304 arrives at a position of disc magazine 130, CPU 301 reads information from a barcode or a radio frequency identifier (RFID), which is attached to, for example, a chassis of disc magazine 130, through disc conveyance robot 304.

CPU 301 obtains optical disc configuration information stored in disc magazine 130 based on the read information. In the case that the plurality of optical discs in which the data is recorded while distributed in the optical discs using the RAID or the like is stored in disc magazine 130, the optical disc configuration information includes information about the distributed recording. In this case, for example, the optical disc configuration information is information indicating the number of optical discs used in the distributed recording, identification information about each of the plurality of optical discs used in the distributed recording, and information indicating a distributed recording method.

For example, in the case that the plurality of optical discs in which the data is recorded while distributed in the optical discs using the RAID is stored in disc magazine 130, the number of optical discs used in the distributed recording is the number of optical discs constituting a set of RAID. The optical disc identification information is one identifying the optical disc. CPU 301 can specify all the optical discs constituting the set of RAID based on the identification information about each of the plurality of distributed recording optical discs. For example, the information indicating the distributed recording method is a RAID rule (for example, a level of RAID 5 or RAID 6) used in the distributed recording.

For example, in the case that the barcode is added to disc magazine 130, CPU 301 can read the barcode using a barcode reader (not illustrated) attached to disc conveyance robot 304. The read information includes disc magazine identification information identifying disc magazine 130. CPU 301 uniquely identifies disc magazine 130 based on the disc magazine identification information. CPU 301 gets access to memory 302, HDD 303, or the external device, and obtains optical disc configuration information corresponding to the disc magazine identification information.

As another method, in the case that the RAID is provided in disc magazine 130, CPU 301 may obtain the optical disc configuration information recorded in the RFID using an RFID reader (not illustrated) attached to disc conveyance robot 304.

(Step S403) CPU 301 obtains the number of optical discs used in a set of distributed recording from the obtained optical disc configuration information. CPU 301 compares the number of optical disc drives that can be used to actually read the data in the optical disc drives included in optical disc device 300 with the number of optical discs.

In the case that the number of optical disc drives that can be used to read the data is greater than or equal to the number of optical discs constituting the data, CPU 301 transfers the processing to step S408. On the other hand, in the case that the number of optical disc drives that can be used to read the data is less than the number of optical discs constituting the data, CPU 301 transfers the processing to step S404.

(Step S404) CPU 301 decides the number of optical discs taken out from disc magazine 130. For example, in the first exemplary embodiment, the 10 optical discs are stored in disc magazine 130, and the data is recorded in the 10 optical discs while distributed in the 10 optical discs. That is, the number of optical discs is 10. On the other hand, only the six optical disc drives can be used to read the data in optical disc device 300. CPU 301 then decides the six optical discs as a first group taken out from disc magazine 130. CPU 301 controls disc conveyance robot 304 so as to select the six optical discs of the first group from the 10 optical discs of disc magazine 130, and to load the six optical discs in optical disc drives 311 to 316.

CPU 301 reads the data from each of the optical discs of the first group loaded in optical disc drives 311 to 316. CPU 301 records the read data in HDD 303 that is of the memory unit. Preferably CPU 301 reads the data in a unit of, for example, a sector of the optical disc when reading the data from the optical disc. For example, sector data that is disc image data in the sector unit is obtained. At this point, information indicating whether the data is successfully read from the sector is also recorded in HDD 303 along with the data read from the optical disc. The sector data may be a part of a disc image data file including a plurality of pieces of sector data.

As described above with reference to FIG. 3, in the first exemplary embodiment, the data read from the optical discs of the first group is temporarily stored in HDD 303 by way of example. However, the content disclosed in the present application is not limited to the use of disc conveyance robot 304. In the case that large-capacity memory 102 is prepared, the data may be stored in memory 102 instead of storing the data in HDD 303. That is, in the content disclosed in the present application, the memory unit can be any storage medium as long as the data is previously read from the optical discs of the first group and stored in the memory unit which is not the optical disc itself.

In reading the data from the optical disc, sometimes the data is not successfully read due to various reasons such as an adhesive material or a flaw on an optical disc recording surface. The optical disc drive reads not only the data but also error detection and correction information recorded along with the data when reading the data from the optical disc. The error detection and correction information is used to detect whether an error exists in the data read from the optical disc, and to correct the error when the error occurs. Using the error detection and correction information, the optical disc drive can detect and correct the error of the data within a capability of the error detection and correction information, even if the data read from the optical disc is erroneous (the error is included).

However, in the case that the error included in the data read from the optical disc is out of the capability of the error detection and correction information, the optical disc drive cannot correct the error. In such cases, CPU 301 stores information indicating that the data cannot be read from a predetermined sector of the optical disc in the memory unit such as HDD 303. FIG. 5 is a view illustrating an example of the information stored in the memory unit. FIG. 5 illustrates a relationship among an address indicated based on a sector unit in one optical disc included in the first group, the data read from the address, and an error detection and correction situation in reading the data.

The address in FIG. 5 is information specifying a position where the corresponding data is recorded. In the first exemplary embodiment, the address in FIG. 5 is recorded in the sector unit. The recorded address may use another address unit such as a cluster unit, a track unit, and a zone unit.

The data on FIG. 5 is one that is read from the corresponding address on the optical disc. In the case that the optical disc drive already performs error detection and correction processing while the error or the like is included in the data read by the optical disc drive, the corrected data is recorded as the data in FIG. 5. On the other hand, in the case that the optical disc drive cannot correct the error while the error is included in the data read by the optical disc drive, it is not necessary to record the information in a column for data in FIG. 5. The case the error cannot be corrected in the optical disc drive will be described later.

Error detection and correction information indicating an error detection and correction situation is recorded in a column for error detection and correction in FIG. 5. The error detection and correction information is one specifying whether the error is included when the optical disc drive reads the data from a designated address, and whether the error is corrected when the error is included.

In various states indicated in the column for error detection and correction of the example in FIG. 5, the case that the error is not included in the data read by the optical disc drive is indicated as "nothing", the case that the error can be corrected while the error is included in the data is indicated as "corrected", and the case that the error cannot be corrected while the error is included in the data is indicated as "error". The error detection information is one indicating whether the error is included in the read data. In the first exemplary embodiment, the above example is described. However, the content disclosed in the present application is not limited to the above example. The content disclosed in the present application is not limited to the data in FIG. 5 as long as the data includes the data read from the optical disc and the information indicating whether the data is successfully read from the optical disc.

In the first exemplary embodiment, the user data that is recorded in the 10 optical discs stored in disc magazine 130 while distributed in the 10 optical discs is read by the six optical disc drives 311 to 316 of optical disc device 300 by way of example. Therefore, six optical discs are selected from the 10 optical discs as the optical discs of the first group, and the remaining four optical discs are loaded in four optical disc drives of optical disc drives 311 to 316.

However, the content described in the present application is not limited to this. For example, it is considered that 20 optical discs are stored in disc magazine 130, and that the data is recorded in the 20 optical discs while distributed in the 20 optical discs. In the case that the data is read using six optical disc drives 311 to 316, the data of six optical discs as the optical discs of the first group is read three times, whereby the data of 18 optical discs is read and previously recorded in HDD 303. Then, the data of remaining two optical discs is read using two optical disc drives of optical disc drives 311 to 316. That is, in this case, step S404 described above is repeated as much as needed.

As used herein, each of the optical discs of the first group means an optical disc in which the data should previously be read and recorded in the memory unit such as HDD 303 in the plurality of optical discs when the user data is recorded in the plurality of optical discs while distributed in the plurality of optical discs.

(Step S405) When the reading of the data from the optical discs of the first group is ended, CPU 301 issues an instruction to disc conveyance robot 304 to return the optical discs of the first group from optical disc drives 311 to 316 to disc magazine 130. CPU 301 issues an instruction to disc conveyance robot 304 to take out the remaining optical discs from disc magazine 130 to load the optical discs in optical disc drives 311 to 314.

(Step S406) CPU 301 reads both the data of the optical discs of the first group, the data being stored in a recording unit such as HDD 303, and the data read from the remaining optical discs loaded in optical disc drives 311 to 314.

(Step S407) CPU 301 reproduces the original user data using the data read from the memory unit in step S406 and the data from the optical disc drives. In the case that there is information indicating that the data stored in the memory unit such as HDD 303 is not successfully read in a certain sector, CPU 301 does not use the stored data with respect to the sector. Similarly, in the case that the data is not successfully read in a certain sector in one of the remaining optical discs loaded in optical disc drives 311 to 314, CPU 301 stops the reading of the data from the optical disc with respect to the sector.

In this case, CPU 301 reproduces the original user data using the data of remaining optical discs, the data being stored in the memory unit such as HDD 303, or the data from other optical discs loaded in optical disc drives 311 to 314. A specific data reproducing method follows the method adopted in recording the data. For example, the data can be reproduced using the RAID or the like.

(Step S408) When the number of usable optical disc drives is greater than or equal to the number of optical discs in which the data is recorded while distributed in the optical discs in step S403, all the optical discs constituting the data are loaded in the optical disc drives. Therefore, the original user data can be reproduced by substantially simultaneously reading the data from all the distributed recording optical discs.

Even if the number of optical disc drives is less than the number of optical discs in which the user data is recorded while distributed in the optical discs, the content described in the present exemplary embodiment can reproduce the original user data. Specifically, the data of the optical discs of the first group in the plurality of optical discs is previously stored in the memory unit different from the optical disc. Then, the remaining optical discs are loaded in the optical disc drives. The data of all the optical discs is obtained from the memory unit and the optical discs, and the original user data is reproduced.

Therefore, in the optical disc device of the present disclosure, the user data can be reproduced irrespective of the number of distributed recording optical discs. The user data can be reproduced even in an environment different from an environment in which the data is recorded in the optical discs while distributed in the optical discs.

Not only the data read from the optical disc but also the information indicating whether the data is successfully read in reading the data is stored when the data is stored in the memory unit. A unit of reading the data from the optical disc is managed sector by sector. Therefore, whether the data is successfully read from a certain sector can also be specified in the optical discs included in the first group. In the case that the data is not successfully read, the original user data can be reproduced using the data of other optical discs, the data being stored in the memory unit, or the data of the optical discs loaded in the optical disc drives.

Thus, not only the data recorded in the sector but also the information indicating whether the data is successfully read from the sector is stored in the memory unit, which allows the user data to be reproduced with no use of the data including the error. Resultantly, the reliability of the reproduced data can further be improved.

In the first exemplary embodiment, the optical disc is used as the removable storage medium by way of example. However, the content described in the present application is not limited to the optical disc. A removable storage medium except for the optical disc, for example, another storage medium such as a memory card and a data recording tape may be used.

In the first exemplary embodiment, by way of example, the data read from the optical discs belonging to the first group is recorded in the memory unit (such as HDD 303) of optical disc device 300. However, the content described in the present application is not limited to the memory unit of optical disc device 300. For example, the data may be stored in a memory unit that is provided in a device different from optical disc device 300.

In the first exemplary embodiment, optical disc device 300 implements the present disclosure by way of example. However, the content described in the present application is not limited to optical disc device 300. For example, the content described in the present application may be implemented as a method for reading the data of the optical disc, which is performed by the optical disc device. At this point, the method can be performed as the software program in which the processing in the flowchart in FIG. 4 is performed by CPU 301.

Other Exemplary Embodiments

The first exemplary embodiment is described above as illustration of the technique disclosed in the present application. However, the technique of the present disclosure is not limited to the first exemplary embodiment, but is applicable to another exemplary embodiment in which a change, a replacement, an addition, or an omission is appropriately made. A new exemplary embodiment can also be made by a combination of the components described in the above exemplary embodiment.

Because the above exemplary embodiment is for exemplifying the technique in the present disclosure, various modifications, replacements, additions, and omissions can be made within the scope of the appended claims or of their equivalents.

The content described in the present application can be used as a data reading device in which the user data is distributed and recorded in a plurality of removable storage media or a data reading method.

What is claimed is:

1. An optical disc device comprising:
    an optical disc drive that reads data from a plurality of optical discs, wherein user data is recorded in such a manner that the user data is distributed among the plurality of optical discs;
    a memory unit that records data read by the optical disc drive from at least one optical disc that is a part of the plurality of optical discs; and
    a controller that reproduces the user data using data of the at least one optical disc from the memory unit and data, read by the optical disc drive, from one or more of the plurality of optical discs other than the at least one optical disc.

2. The optical disc device according to claim 1, wherein the memory unit records (i) each sector data, the sector data read from a sector of the at least one optical disc and (ii) error detection information indicating whether each reading of the sector, corresponding to the sector data, is successful.

3. The optical disc device according to claim 2, wherein, when the error detection information indicates that reading of first sector data from a first sector of a first optical disc, the first sector of the first optical disc is corresponding to the first sector data, was not successful,
    the controller reproduces user data, corresponding to the first sector, based on data of other optical discs in the plurality of optical discs, and
    the controller acquires each of the data of other optical discs (i) from corresponding sector data, recorded in the memory unit, or (ii) by reading the corresponding optical disc using the optical disc drive.

4. A method for reproducing user data from a plurality of optical discs, wherein the user data is previously recorded in such a manner that the user data is distributed among the plurality of optical discs, the method comprising:
    loading at least one optical disc that is a part of the plurality of optical discs in an optical disc drive, reading data from the at least one optical disc, and storing the data into a memory unit; and
    reproducing the user data using data of the at least one optical disc from the memory unit and data, read by the optical disc drive, from one or more of the plurality of optical discs other than the at least one optical disc.

5. The optical disc reading method according to claim 4, wherein, in the storing the data in the memory unit, recording (i) each sector data, the sector data read from a sector of the at least one optical disc and (ii) error detection information indicating whether each reading of the sector, corresponding to the sector data, is successful.

6. The optical disc reading method according to claim 5, wherein,
when the error detection information indicates that reading of first sector data from a first sector of a first optical disc, the first sector of the first optical disc is corresponding to the first sector data, was not successful, the reproducing the user data includes:
reproducing user data, corresponding to the first sector data, based on data of other optical discs in the plurality of optical discs; and
acquiring each of the data of other optical discs (i) from corresponding sector data, recorded in the memory unit, or (ii) by reading the corresponding optical disc using the optical disc drive.

* * * * *